(12) United States Patent
Matsumoto

(10) Patent No.: US 10,365,533 B2
(45) Date of Patent: Jul. 30, 2019

(54) ELECTROPHORETIC DISPLAY DEVICE AND ELECTRONIC APPARATUS

(71) Applicant: E Ink Corporation, Billerica, MA (US)

(72) Inventor: Akihito Matsumoto, Chino (JP)

(73) Assignee: E Ink Corporation, Billerica, MA (US)

( * ) Notice: Subject to any disclaimer, the term of this patent is extended or adjusted under 35 U.S.C. 154(b) by 28 days.

(21) Appl. No.: 15/373,866

(22) Filed: Dec. 9, 2016

(65) Prior Publication Data
US 2017/0176837 A1 Jun. 22, 2017

(30) Foreign Application Priority Data
Dec. 17, 2015 (JP) .................................. 2015-246046

(51) Int. Cl.
| | | |
|---|---|---|
| G02B 26/00 | (2006.01) | |
| G09G 3/34 | (2006.01) | |
| G02F 1/167 | (2019.01) | |
| G02F 1/1676 | (2019.01) | |
| G02F 1/1681 | (2019.01) | |

(52) U.S. Cl.
CPC ............ *G02F 1/167* (2013.01); *G02F 1/1676* (2019.01); *G02F 1/1681* (2019.01); *G02F 2201/121* (2013.01)

(58) Field of Classification Search
CPC .. G02F 1/167; G02F 1/1309; G02F 1/133514; G02F 1/136213; G02F 2001/133562; G02F 2001/136254; G02F 2001/1676; G02F 2001/1672; G02F 2201/121
USPC ........ 359/237, 242, 247, 265–267, 290–292, 359/295, 296, 298, 315, 321–322
See application file for complete search history.

(56) References Cited

U.S. PATENT DOCUMENTS

| | | | |
|---|---|---|---|
| 2009/0122653 A1* | 5/2009 | Seki | .................... G02F 1/13452 368/82 |
| 2012/0236220 A1* | 9/2012 | Sato | .................... G02F 1/13452 349/33 |

FOREIGN PATENT DOCUMENTS

JP      2009-115686 A      5/2009

* cited by examiner

*Primary Examiner* — Brandi N Thomas
(74) *Attorney, Agent, or Firm* — Antranig Baronian

(57) ABSTRACT

An electrophoretic display device includes: a first substrate on which a common electrode is provided; a second substrate on which a pixel electrode and a plurality of terminals are provided; dispersion liquid that is provided between the first substrate and the second substrate and includes particles and a dispersion medium; and two or more connecting portions that electrically connect two or more terminals among the plurality of terminals respectively to different points of the common electrode.

10 Claims, 7 Drawing Sheets

ELECTROPHORETIC DISPLAY DEVICE AND ELECTRONIC APPARATUS

BACKGROUND

1. Technical Field

The present invention relates to an electrophoretic display device and an electronic apparatus.

2. Related Art

A display device using electrophoresis (electrophoretic display device) is known. An electrophoretic display device has an electrophoretic layer between two substrates facing each other (in this specification, these two substrates are referred to as "pixel substrate" and "opposite substrate"), and performs display by utilizing the motion, under the influence of an electric field, of charged particles (migration particles) that migrate in a dispersion medium (solvent) that exists in the electrophoretic layer. The electric field is generated by applying a potential difference between the two substrates. A surface of one of the two substrates (surface of the opposite substrate) is a display surface. A partitioning wall is provided between the two substrates. The electrophoretic layer is compartmentalized by the partitioning wall into plural areas (cells). Each area (cell) constitutes, for example, a pixel. An electrophoretic display device can be applied to an electronic apparatus such as electronic paper. The abbreviated name of an electrophoretic display device is EPD (Electrophoretic Display).

In a production process of the display panel of an electrophoretic display device, for example, a partitioning wall unit for retaining dispersion liquid of an electrophoretic layer is formed on a pixel substrate unit that has a control circuit. Then, the dispersion liquid is poured into it. After that, the dispersion liquid is sealed by bonding a glass substrate (opposite substrate) that has a transparent electrode (common electrode) thereto. In such an electrophoretic display device, the control circuit of the pixel substrate unit controls potential between pixel electrodes, which are on the pixel substrate unit, and a common electrode. The content of display is controlled as a result of potential control therebetween.

FIG. 13 is a diagram that illustrates the contact structure 1011 of a COM electrode portion 1023 of an electrophoretic display device according to related art. The pixel area portion 1021 of a pixel substrate (backplane substrate), plural terminals whose number is M (where M is an integer greater than one; denoted as 1022-1 to 1022-M), a wiring line 1024, and the COM electrode portion 1023 are shown in FIG. 13. One terminal 1022-1 is connected to the COM electrode portion 1023 via the wiring line 1024. The COM electrode portion 1023 is connected to the common electrode of the opposite substrate (not illustrated in FIG. 13). As described above, the contact structure 1011 of the example illustrated in FIG. 13 has a portion for contact of the terminal 1022-1 and the COM electrode portion 1023 with each other (contact portion) in a part of the display panel.

In an electrophoretic display device, the height of an opposite substrate is approximately 500 [µm], and the height of partitioning wall is approximately 30 [µm]. Therefore, it would be difficult in terms of manufacturing cost to use a method of, as in a conventional semiconductor process, forming a through hole by etching and then sputtering metal such as AL (aluminum) for forming a contact for a common electrode. For this reason, it is common to form a contact for a common electrode by using conductive paste such as Ag (silver) paste.

FIG. 14 is a diagram that illustrates an equivalent circuit of the contact structure 1011 of the COM electrode portion 1023 of an electrophoretic display device according to related art. The schematic circuit configuration illustrated therein will now be explained. In the equivalent circuit, a COM electrode 1101 that is at a predetermined potential (VCOM0) is connected to a contact resistor (contact resistance) 1103 via a wiring line 1102. A point P1 is connected to one terminal of the contact resistor 1103. A point P2 is connected to the other terminal of the contact resistor 1103. A wiring line portion going through the contact resistor 1103 and another wiring line portion on which no circuit element is provided are connected in parallel between the points P1 and P2. The COM electrode 1101 of the predetermined potential (VCOM0) corresponds to the COM electrode of the COM electrode portion 1023 illustrated in FIG. 13. In the contact structure 1011 described above, it is not possible to directly measure the resistance value of the contact resistor 1103 of the COM electrode portion 1023.

With reference to JP-A-2009-115686, an example is shown below. A display device is disclosed in JP-A-2009-115686. In the display device, a conducting member is provided between a common electrode and a common electrode conducting portion (COM) (refer to FIG. 5 of JP-A-2009-115686). In this structure, when a display panel is driven, a voltage is applied to the common electrode conducting portion (COM) formed on the lower substrate. As a result, the voltage is applied via the conducting member to the common electrode. In this structure, it is not possible to directly measure the resistance value of the contact resistor of the common electrode.

As explained above, in an electrophoretic display device according to related art, it is not possible to directly measure the resistance value of the contact resistor of a common electrode. However, since an image is controlled in an electrophoretic display device by controlling an electric field between pixel electrodes and a common electrode, the resistance value of the contact resistor is an important parameter. For this reason, in some cases, it is necessary to measure the resistance value of the contact resistor. For example, in related art, there is a problem that a direct measurement approach cannot be taken; specifically, there is no option but to shave the periphery of a part of the common electrode so as to expose the contact portion of the common electrode, wire the exposed portion, and measure the resistance value of the contact resistor on the basis of the current value of the wiring indirectly. When production stability in mass production is considered, a structure that makes it possible to measure the resistance value of the contact resistor easily is very important.

SUMMARY

An advantage of some aspects of the invention is to provide an electrophoretic display device and an electronic apparatus that makes it possible to directly measure the resistance value of the contact resistance of a common electrode.

An electrophoretic display device according to an aspect of the invention includes: a first substrate on which a common electrode is provided; a second substrate on which a pixel electrode and a plurality of terminals are provided; dispersion liquid that is provided between the first substrate and the second substrate and includes particles and a dispersion medium; and two or more connecting portions that electrically connect two or more terminals among the plurality of terminals respectively to different points of the common electrode. In the electrophoretic display device having the above structure, the two or more terminals provided on the second substrate are electrically connected respectively to the different points of the common electrode via the connecting portions. By this means, in the electrophoretic display device, it is possible to directly measure the resistance value of the contact resistance of the common electrode.

In an electrophoretic display device according to an aspect of the invention, the respective two or more terminals among the plurality of terminals may be electrically connected to the respective different points of the common electrode via respective conducting portions; and each of the conducting portions may be provided in an opening of a frame portion that has the opening. In the electrophoretic display device having the above structure, the respective two or more terminals provided on the second substrate are electrically connected to the respective different points of the common electrode via the respective conducting portions, each of which is provided in the opening of the frame portion. This realizes the structural reinforcement of the electrophoretic display device by the frame portions.

In an electrophoretic display device according to an aspect of the invention, a partitioning wall may be provided between the first substrate and the second substrate; and the dispersion liquid may be provided at compartment areas partitioned by the partitioning wall. In the electrophoretic display device having the above structure, the layer is compartmentalized by the partitioning wall into the plural areas. By this means, in the electrophoretic display device having the partitioning-wall structure, it is possible to directly measure the resistance value of the contact resistance of the common electrode.

In an electrophoretic display device according to an aspect of the invention, a plurality of microcapsules may be provided between the first substrate and the second substrate; and the dispersion liquid may be provided inside the microcapsules. In the electrophoretic display device having the above structure, the layer is compartmentalized by the microcapsules into the plural areas. By this means, in the electrophoretic display device having the microcapsule structure, it is possible to directly measure the resistance value of the contact resistance of the common electrode.

In an electrophoretic display device according to an aspect of the invention, the two or more terminals may include at least, among the plurality of terminals, two end terminals (terminals at both ends). In the electrophoretic display device having the above structure, at least the two end terminals among the plurality of terminals are electrically connected to the common electrode. This structure makes it possible to simplify the electric connection of the two or more terminals to the common electrode in the electrophoretic display device.

In an electrophoretic display device according to an aspect of the invention, the two or more terminals may be at the same potential when driven. In the electrophoretic display device having the above structure, the two or more terminals are at the same potential when driven. By this means, in the electrophoretic display device, it is possible to directly measure the resistance value of the contact resistance of the common electrode.

An electronic apparatus according to an aspect of the invention includes the above electrophoretic display device. In the electrophoretic display device of the electronic apparatus having the above structure, the two or more terminals provided on the second substrate are electrically connected respectively to the different points of the common electrode via the connecting portions. By this means, in the electrophoretic display device of the electronic apparatus, it is possible to directly measure the resistance value of the contact resistance of the common electrode.

As described above, in an electrophoretic display device according to an aspect of the invention, and in an electronic apparatus including an electrophoretic display device according to an aspect of the invention, the two or more terminals provided on the second substrate are electrically connected respectively to the different points of the common electrode via the connecting portions. By this means, in an electrophoretic display device according to an aspect of the invention, and in an electronic apparatus including an electrophoretic display device according to an aspect of the invention, it is possible to directly measure the resistance value of the contact resistance of the common electrode.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the accompanying drawings, some exemplary embodiments of the invention will now be explained in detail.

First Embodiment

Overview of Contact Structure of COM Electrode

Figure 1:
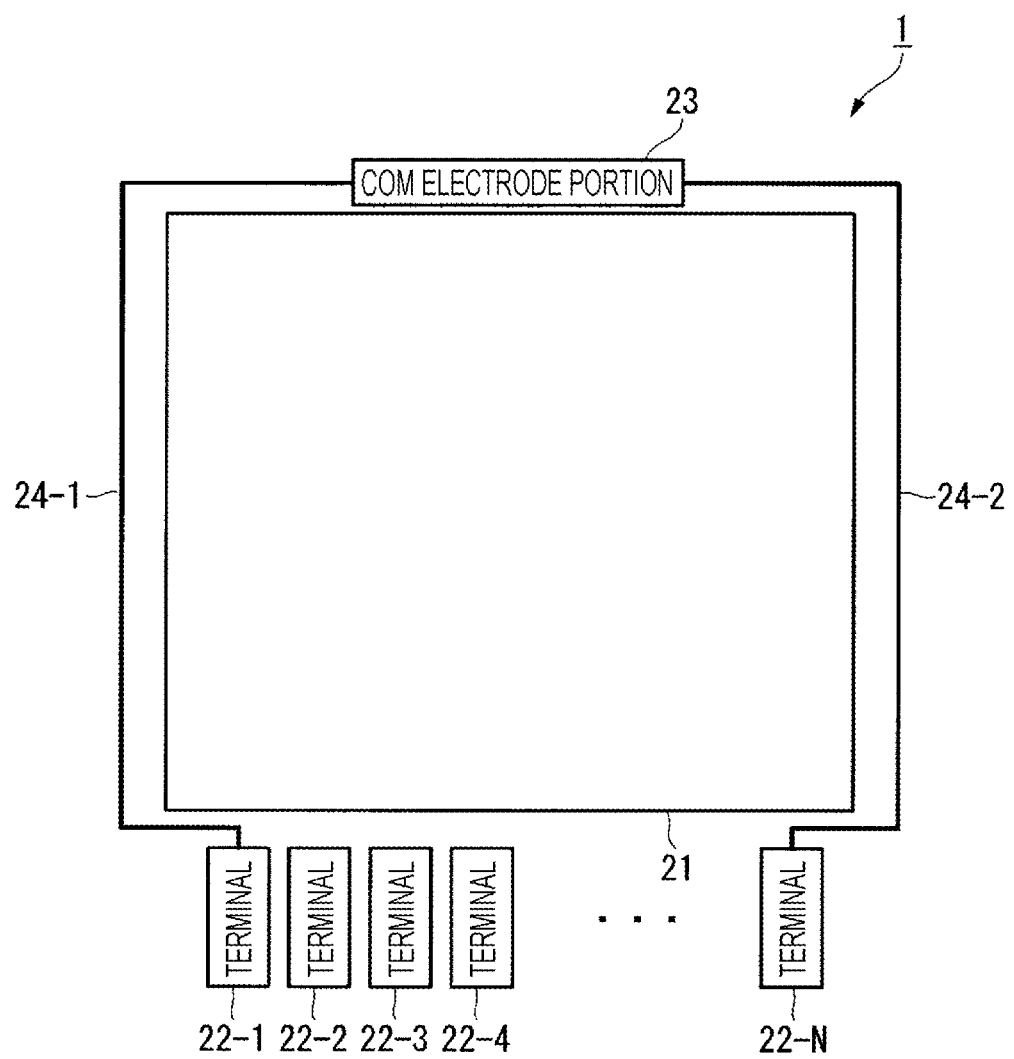
FIG. 1 is a diagram that illustrates an example of the contact structure of COM electrodes of an electrophoretic display device according to an exemplary embodiment (first embodiment) of the invention.
Figure 13:
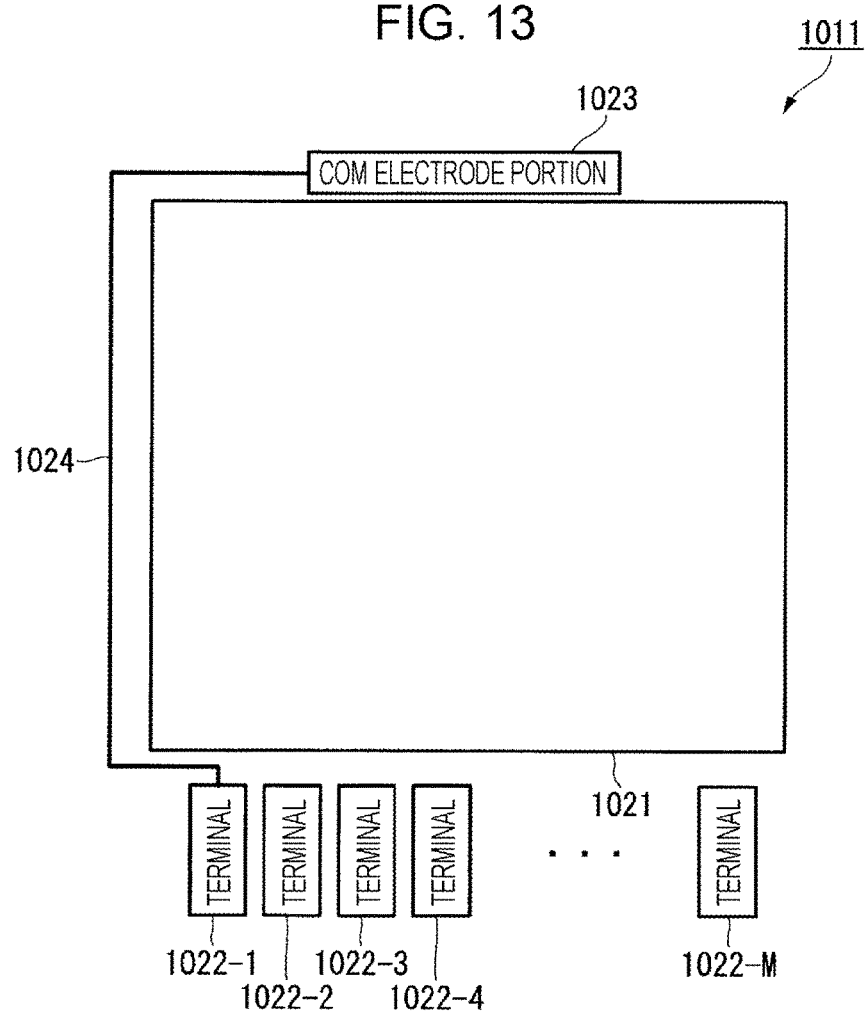
FIG. 13 is a diagram that illustrates the contact structure of a COM electrode of an electrophoretic display device according to related art.
Figure 14:
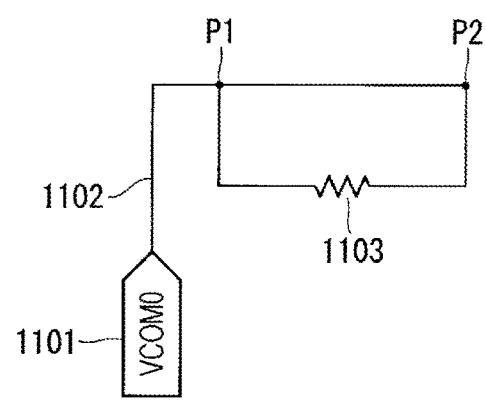
FIG. 14 is a diagram that illustrates an equivalent circuit of the contact structure of the COM electrode of an electrophoretic display device according to related art.

FIG. 1 is a diagram that illustrates an example of the contact structure 1 of COM electrodes of an electrophoretic display device according to an exemplary embodiment (first embodiment) of the invention. The pixel area portion 21 of a pixel substrate, plural terminals whose number is N (where N is an integer that is greater than one and may be the same as M shown in FIG. 13; denoted as 22-1 to 22-N), wiring lines 24-1 and 24-2, and a COM electrode portion 23 are shown in FIG. 1. In the present embodiment, the terminals located at both ends (terminals 22-1 and 22-N) are at the same potential when driven. One terminal 22-1 is connected to the COM electrode portion 23 via the wiring line 24-1. Another terminal 22-N is connected to the COM electrode portion 23 via the other wiring line, that is, 24-2. The COM electrode portion 23 is connected to the common electrode of the opposite substrate (not illustrated in FIG. 1). As described above, the contact structure 1 according to the present embodiment has portions for contact of the two terminals 22-1, 22-N and the COM electrode portion 23 with each other (contact portions) in a part of the display panel.

In the present embodiment, the plural terminals 22-1 to 22-N and the COM electrode portion 23 are formed at regions that are the opposite of each other, and the pixel area portion 21 is located between the region of the plural terminals 22-1 to 22-N and the region of the COM electrode portion 23. The pixel area portion 21 is the area of plural pixels. Specifically, the plural terminals 22-1 to 22-N are arranged in a line in a predetermined area (electrode arrangement area). Two terminals (the terminal 22-1 located at one end and the terminal 22-N located at the other end) are connected to the COM electrode portion 23 via the wiring lines 24-1 and 24-2 respectively. Each of the two wiring lines 24-1 and 24-2 is routed outside the pixel area portion 21. The pixel area portion 21 is enclosed (but not all around) by the two wiring lines 24-1 and 24-2. This layout contributes to a reduction in the space of the contact portions in the present embodiment.

Overview of Electrophoretic Display Device

Figure 2:
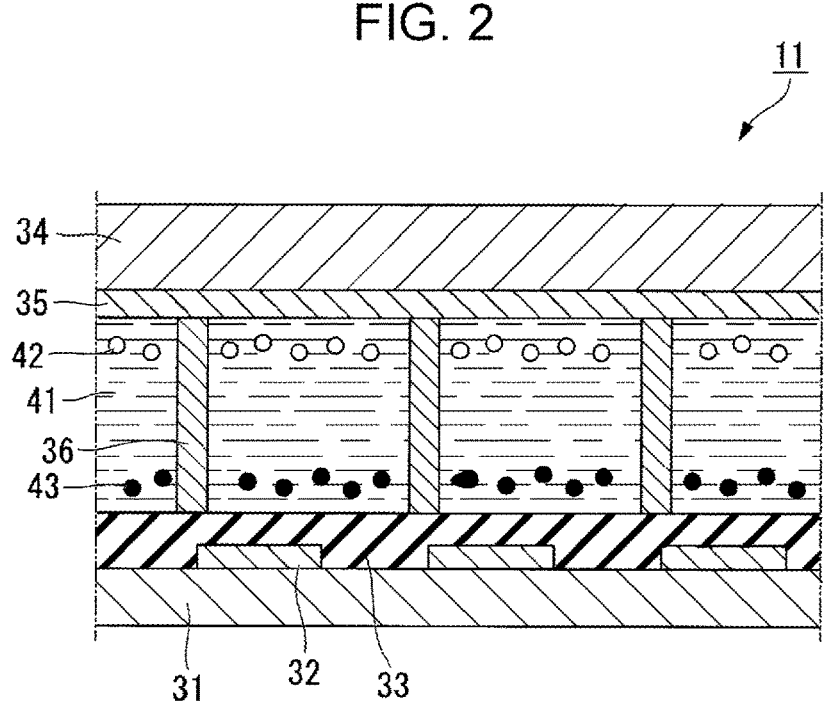
FIG. 2 is a sectional view of a structure example of an electrophoretic display device according to an exemplary embodiment (first embodiment) of the invention.

FIG. 2 is a sectional view of an example of the structure of an electrophoretic display device according to an exemplary embodiment (first embodiment) of the invention (referred to as "electrophoretic display device 11" in the explanation of FIG. 2). The electrophoretic display device 11 includes a pixel substrate 31, a plurality of pixel electrodes 32 formed on the pixel substrate 31, an insulation layer 33 formed on the pixel substrate 31 in such a way as to cover the pixel electrodes 32, an opposite substrate 34 facing the pixel substrate 31, a common electrode (opposite electrode) 35 formed on the opposite substrate 34, a partitioning wall 36 compartmentalizing the space between the pixel substrate 31 and the opposite substrate 34 into plural areas (cells), and a dispersion medium 41 and particles (migration particles) 42 and 43 sealed in the areas (cells). The areas (cells) correspond to, for example, pixels. The pixel area portion 21 illustrated in FIG. 1 is sealed between the pixel substrate 31 and the opposite substrate 34 by a sealant (not illustrated) provided in an area including periphery around the edges of the pixel area portion 21. The sealant is made of, for example, epoxy resin.

The dispersion medium 41 and the particles 42 and 43 make up dispersion liquid. The layer of the dispersion liquid behaves as an electrophoretic layer. In the present embodiment, the electrophoretic display device 11 includes the particles 42 that are negatively charged and correspond to white and the particles 43 that are positively charged and correspond to black. The number of the particles may be any other integer that is not less than one. The color of each particle may be any other color. The pixel substrate 31 and the opposite substrate 34 are disposed to face each other. The pixel substrate 31 and the opposite substrate 34 are disposed in parallel to each other. In the present embodiment, each of the pixel substrate 31 and the opposite substrate 34 has a plate-like shape. In the present embodiment, the common electrode 35 is common to the plural pixel electrodes 32.

Specific Example of Contact Structure of COM Electrode

Figure 3:
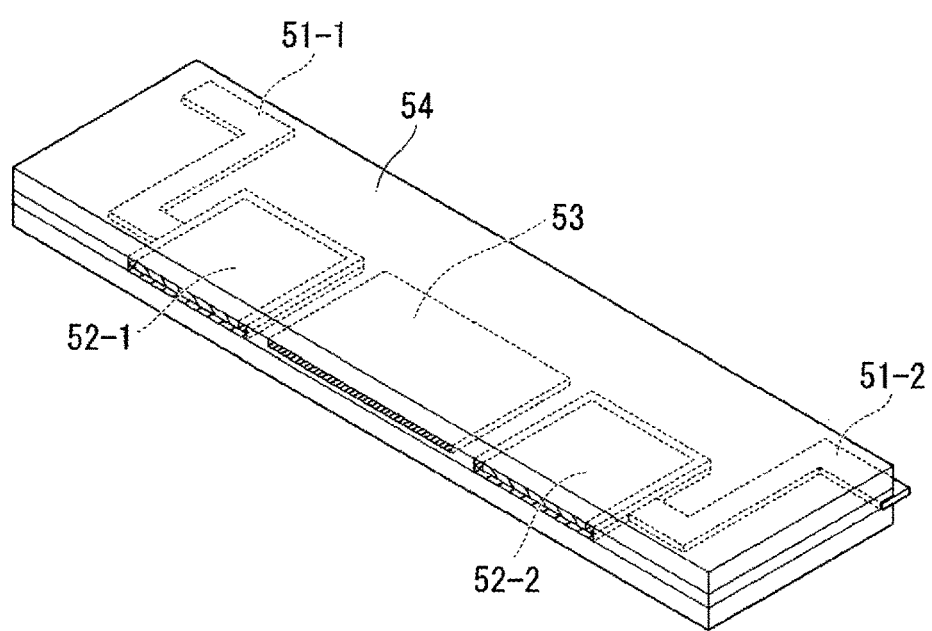
FIG. 3 is a cross-sectional perspective view of a structure example regarding the contact structure of COM electrodes of an electrophoretic display device according to an exemplary embodiment (first embodiment) of the invention.
Figure 4:
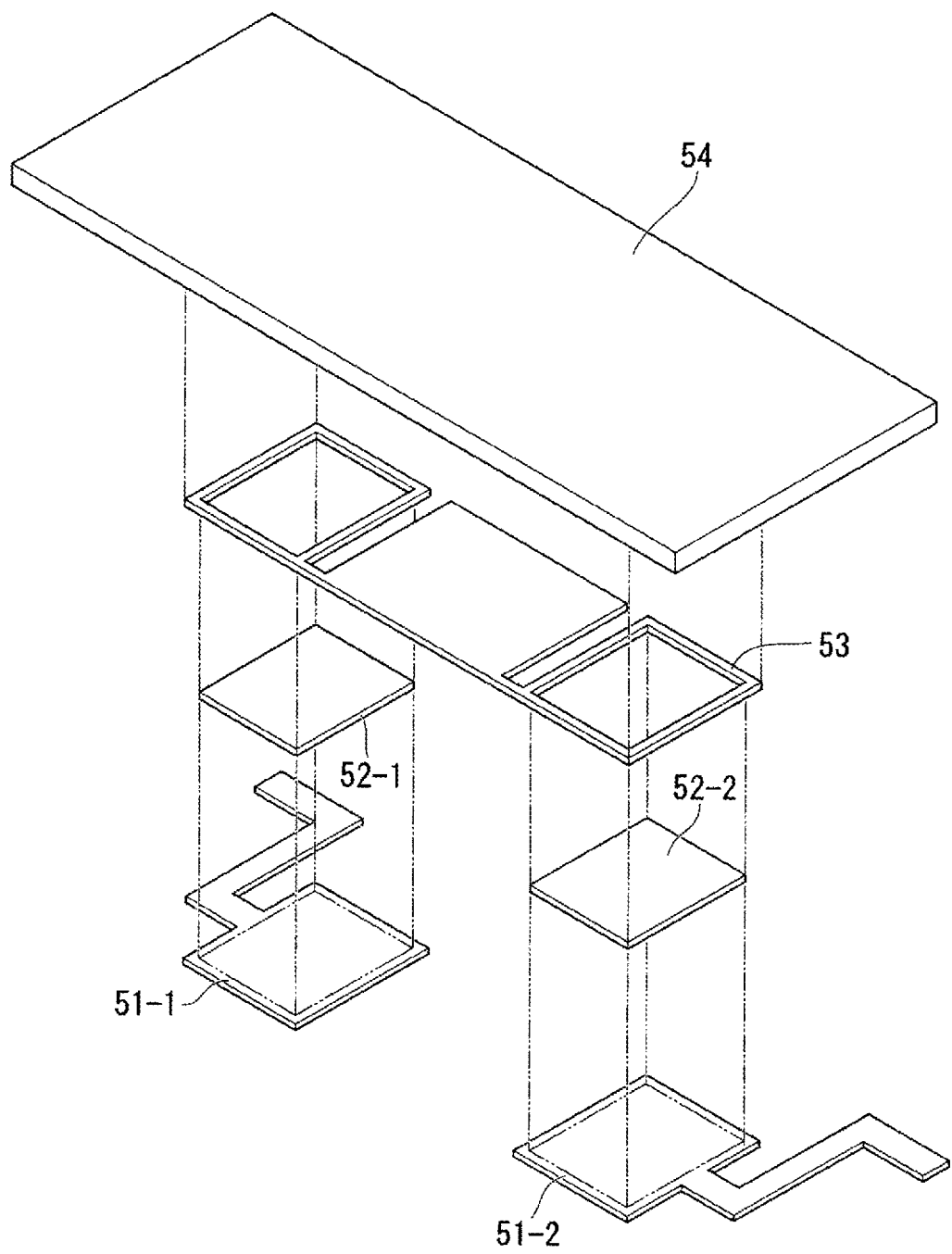
FIG. 4 is an exploded perspective view of a structure example regarding the contact structure of COM electrodes of an electrophoretic display device according to an exemplary embodiment (first embodiment) of the invention.

FIG. 3 is a cross-sectional perspective view of a structure example regarding the contact structure 1 of COM electrodes of an electrophoretic display device according to an exemplary embodiment (first embodiment) of the invention. FIG. 4 is an exploded perspective view of a structure example regarding the contact structure 1 of COM electrodes of an electrophoretic display device according to an exemplary embodiment (first embodiment) of the invention. Two COM electrodes (connecting portions) 51-1 and 51-2, two conducting portions 52-1 and 52-2, a partitioning wall portion 53, and a common electrode 54 are shown as parts before assembly in FIG. 4. A state after the assembly of these parts is shown in FIG. 3.

The structure illustrated in FIGS. 3 and 4 is the structure of periphery including the COM electrode portion 23 illustrated in FIG. 1. The illustration of the pixel area portion 21, the plural terminals 22-1 to 22-N, and the wiring lines 24-1 and 24-2 illustrated in FIG. 1 is omitted in FIGS. 3 and 4. The structure illustrated in FIG. 2 is the structure of the pixel area portion 21 illustrated in FIG. 1, excluding the periphery, and the structure illustrated in FIGS. 3 and 4 is provided around it.

The COM electrodes 51-1 and 51-2 illustrated in FIGS. 3 and 4 are plate electrodes constituting the COM electrode portion 23 illustrated in FIG. 1. The partitioning wall portion 53 illustrated in FIGS. 3 and 4 is a plate pattern constituting the partitioning wall 36 illustrated in FIG. 2. The common electrode 54 illustrated in FIGS. 3 and 4 is a plate electrode constituting the common electrode 35 illustrated in FIG. 2.

Each of the COM electrodes 51-1 and 51-2 has a portion that has a substantially square shape (or may have a substantially rectangular shape) and a portion for connecting the square (or rectangular) portion to the terminal (not illustrated in FIGS. 3 and 4). In the present embodiment, one of the two COM electrodes, 51-1, is connected to the one terminal 22-1 illustrated in FIG. 1, and the other, 51-2, is connected to the other terminal 22-N illustrated in FIG. 1. The partitioning wall portion 53 has a middle portion that has a substantially rectangular shape (or may have a substantially square shape) and frame portions that are located at the opposite of each other, with the rectangular (or square) middle portion located therebetween, wherein each of the frame portions has a substantially square shape (or may have a substantially rectangular shape). The two frame portions are arranged in such a way that each frame is positioned over the substantially square portion (or substantially rectangular portion) of the corresponding one of the two COM electrodes 51-1 and 51-2.

In the illustrated structure example of the present embodiment, the partitioning wall portion 53 includes the frame portions integrally as its parts. For example, the entirety of the partitioning wall portion 53 including the frame portions is made of the same material and can be manufactured through one and the same process. The partitioning wall portion 53 includes a portion (not illustrated) constituting the partitioning wall 36 integrally with the frame portions, though the regions in the neighborhood of the frame portions of the partitioning wall portion 53 are mainly illustrated in FIGS. 3 and 4.

Each of the conducting portions 52-1 and 52-2 has a contour shape that is substantially the same as the opening shape of the corresponding one of the two frame portions (window opening in the frame). In addition, the shape of each of the conducting portions 52-1 and 52-2 is roughly the same as the shape of the corresponding one of the COM electrodes 51-1 and 51-2. The common electrode 54 has a shape for covering at least the portion of the pixel area (pixel area portion 21 illustrated in FIG. 1) in the partitioning wall portion 53. The common electrode 54 may have, for example, a shape for covering the partitioning wall portion 53 in its entirety.

Assembly processes are as follows. For electric conduction, one side (pixel-substrate-side surface) of each of the conducting portions 52-1 and 52-2 is disposed in contact with one side (opposite-substrate-side surface) of the corresponding one of the COM electrodes 51-1 and 51-2. Each of the conducting portions 52-1 and 52-2 is inserted into the opening of the corresponding one of the two frames of the partitioning wall portion 53. For electric conduction, the other side (opposite-substrate-side surface) of each of the conducting portions 52-1 and 52-2 is disposed in contact with one side (pixel-substrate-side surface) of the common electrode 54.

For example, a conductive member whose shape is fixed may be used as the conducting portion 52-1, 52-2. Alternatively, a liquid substance that has electric conductivity (referred to as "conductive agent" in the present embodiment) may be used as the conducting portion 52-1, 52-2. For example, in a case where a conductive agent is used, the conductive agent is put into the inside of the frames of the partitioning wall portion 53 by means of a dispenser. In the present embodiment, in order to ensure positional accuracy, the partitioning wall is formed at an area larger than the external size of the dispenser. For example, if the external size of the dispenser is L3 in diameter (where L3 is a positive value), the internal dimension L1 of the partition wall is set to satisfy L1>L3 (or a value greater than L1 L3). To allow a connection margin of the conductive agent and the common electrode 54, the distance L2 between each of the frame portions and the rectangular portion is set to satisfy L2 L4 in consideration of overrun of approx. L4 in length (where L4 is a positive value).

Figure 5:
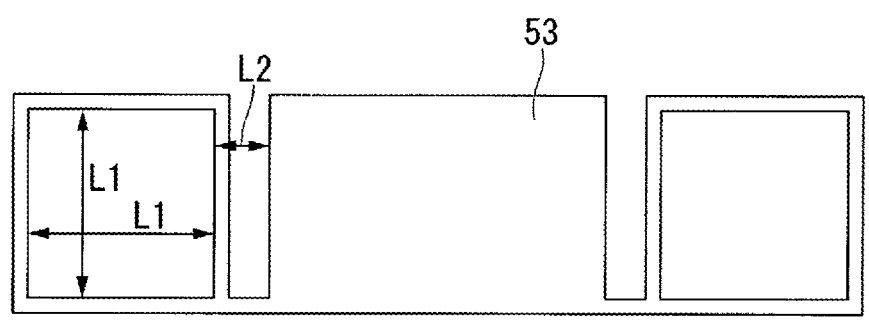
FIG. 5 is a diagram that illustrates a structure example of a partitioning wall portion according to an exemplary embodiment (first embodiment) of the invention.

FIG. 5 is a diagram that illustrates a structure example of the partitioning wall portion 53 according to an exemplary embodiment (first embodiment) of the invention. In the example of FIG. 5, the same portions of the partitioning wall portion 53 as those of the example illustrated in FIGS. 3 and 4 are shown. In the example illustrated in FIG. 5, the partitioning wall portion 53 has a rectangular portion (center portion in the example illustrated in FIG. 5) and square frames (frame portions) that are located at the opposite of each other (left and right in the example illustrated in FIG. 5), with the rectangular portion located therebetween. The shape of one of the two frame portions is the same as the shape of the other. The length of each one side of the square opening of each of the frame portions is L1 (where L1 is an arbitrary positive value). The distance (length) between one of the two frame portions and the rectangular portion is the same as the distance between the other and the rectangular portion, which is L2 (where L2 is an arbitrary positive value). In the example illustrated in FIG. 5, the length L2 is less than the length L1. For example, the length L2 is approximately ⅓, 1/3.5, ¼, 1/4.5, or ⅕ of the Length L1.

Figure 6:
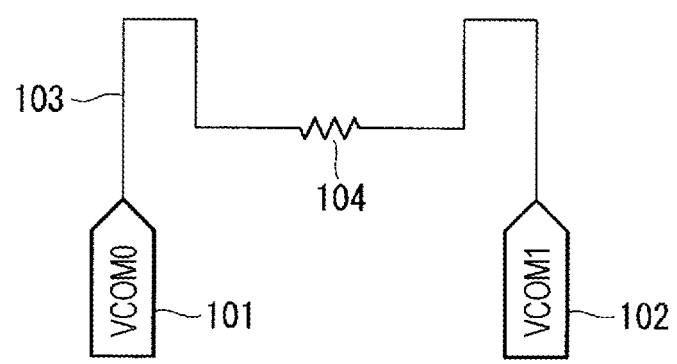
FIG. 6 is a diagram that illustrates an example of a schematic equivalent circuit of the contact structure of COM electrodes of an electrophoretic display device according to an exemplary embodiment (first embodiment) of the invention.

FIG. 6 is a diagram that illustrates an example of a schematic equivalent circuit of the contact structure 1 of COM electrodes of an electrophoretic display device according to an exemplary embodiment (first embodiment) of the invention. In the equivalent circuit, a COM electrode 101 that is at a predetermined potential (VCOM0) is connected to a COM electrode 102 that is at a predetermined potential (VCOM1) via a wiring line 103 on which a contact resistor 104 is provided. The one COM electrode 101 of the one predetermined potential (VCOM0) corresponds to the COM electrode 51-1 illustrated in FIG. 4, and the other COM electrode 102 of the other predetermined potential (VCOM1) corresponds to the COM electrode 51-2 illustrated in FIG. 4. In the contact structure 1 described above, it is possible to directly measure the resistance value of the contact resistor 104 of the COM electrode portion 23.

Figure 7:
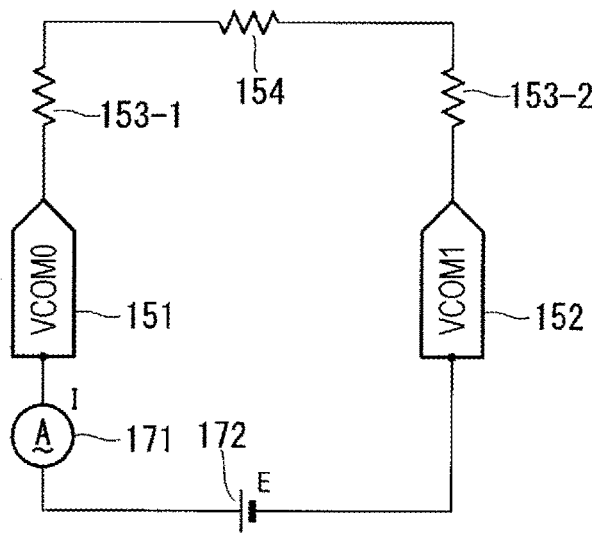
FIG. 7 is a diagram that illustrates an example of an equivalent circuit that measures the resistance values of contact resistors according to an exemplary embodiment (first embodiment) of the invention.

FIG. 7 is a diagram that illustrates an example of an equivalent circuit that measures the resistance values rc and rc of contact resistors 153-1 and 153-2 according to an exemplary embodiment (first embodiment) of the invention. In the equivalent circuit, one end (for example, positive terminal) of a power supply 172, an ammeter 171, a COM electrode 151 that is at a predetermined potential (VCOM0), a contact resistor 153-1, a sheet resistance 154 of the common electrode 54 (common electrode sheet resistor), a contact resistor 153-2, and a COM electrode 152 that is at a predetermined potential (VCOM1) are connected in series. In addition, the COM electrode 152 of the predetermined potential (VCOM1) is connected to the other end (for example, negative terminal) of the power supply 172. The one COM electrode 151 of the one predetermined potential (VCOM0) corresponds to the COM electrode 51-1 illustrated in FIG. 4, and the other COM electrode 152 of the other predetermined potential (VCOM1) corresponds to the COM electrode 51-2 illustrated in FIG. 4.

The equivalent circuit illustrated in FIG. 7 is more detailed than the schematic equivalent circuit illustrated in FIG. 6. The power supply 172 and the ammeter 171 are inspection instruments (referred to as "tester for inspection" in the present embodiment). In the present embodiment, during the manufacturing of the display panel of an electrophoretic display device at a factory, the resistance values rc and rc of the contact resistors 153-1 and 153-2 of the common electrode 54 and the COM electrodes 151 and 152 are measured using the tester for inspection. By this means, it is possible to inspect the contact resistors 153-1 and 153-2.

An example of a method for calculating (measuring) the resistance values rc and rc of the contact resistors 153-1 and 153-2 will now be explained. The ammeter 171 and the power supply 172 are connected to the two COM electrodes 151 and 152. Let E be a voltage applied to the power supply 172 (where E is an arbitrary value). Let I be an electric current that flows through the ammeter 171 when the voltage E is applied to the power supply 172 (where I is an arbitrary value). In the present embodiment, the resistance value rc of one of the two contact resistors, 153-1, is the same as the resistance value rc of the other, 153-2. Let rs be the resistance value of the common electrode sheet resistor 154 (where rs is a value greater than zero). Let us assume that the resistance value rs of the common electrode sheet resistor 154 is a known value that is based on sheet thickness. In general, ITO (Indium Tin Oxide) is used as the material of the common electrode 54. However, any other material may be used. Equation (1) shown below holds because of Ohm's law. Therefore, it is possible to calculate the resistance values rc and rc of the contact resistors 153-1 and 153-2 using the mathematical relationship shown below. As described above, it is possible to calculate the resistance values rc and rc of the contact resistors 153-1 and 153-2 by measuring the current I between the two COM electrodes 151 and 152.

$$E = I \times (rc + rs + rc)$$

$$rc = (E/I - rs)/2 \, [\Omega] \qquad (1)$$

As described above, in the contact structure 1 according to the present embodiment, plural COM electrodes 151 and 152 (COM electrodes 51-1 and 51-2 illustrated in FIG. 4) are provided, and, by not allowing conduction therethrough, it is possible to calculate the resistance values rc and rc of the contact resistors 153-1 and 153-2.

As another structure example, an electrophoretic display device (finished product) may have a function of a mode for measuring the resistance values rc and rc of the contact resistors 153-1 and 153-2 (for example, test mode). In this structure, when the test mode is not ON, the electrophoretic display device is in a state in which the ammeter 171 and the power supply 172 are not connected to the COM electrodes 151 and 152. When activated into test mode ON, the electrophoretic display device switches into a state in which the ammeter 171 and the power supply 172 are connected to the COM electrodes 151 and 152 so as to measure (for example, calculate) the resistance values rc and rc of the contact resistors 153-1 and 153-2. For example, test mode switching may be performed manually by a user. Alternatively, it may be performed automatically by the apparatus.

Figure 8:
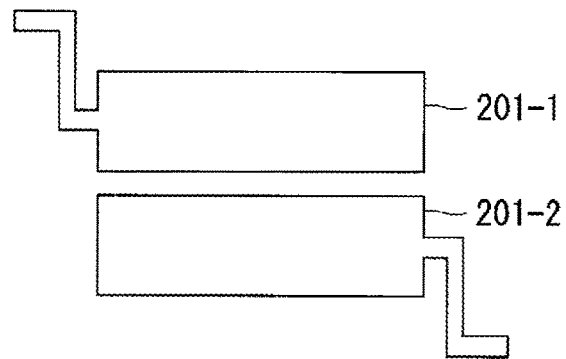
FIG. 8 is a diagram that illustrates a variation example (first variation example) of COM electrodes of an electrophoretic display device according to an exemplary embodiment (first embodiment) of the invention.

FIG. 8 is a diagram that illustrates a variation example (first variation example) of COM electrodes 201-1 and 201-2 of an electrophoretic display device according to an exemplary embodiment (first embodiment) of the invention. The main difference between the two COM electrodes 201-1 and 201-2 of this variation example and the two COM electrodes 51-1 and 51-2 illustrated in FIG. 4 lies in their arrangement. Specifically, the array direction of the two COM electrodes 201-1 and 201-2 of this variation example (for example, arranged next to each other in a vertical direction) is orthogonal to (or substantially orthogonal to) the array direction of the two COM electrodes 51-1 and 51-2 illustrated in FIG. 4 (for example, arranged next to each other in a horizontal direction). In this variation example, the shape and arrangement of the frame portions of the partitioning wall portion and the conductive agent are determined depending on the shape and arrangement of the two COM electrodes 201-1 and 201-2 of this variation example.

Figure 9:
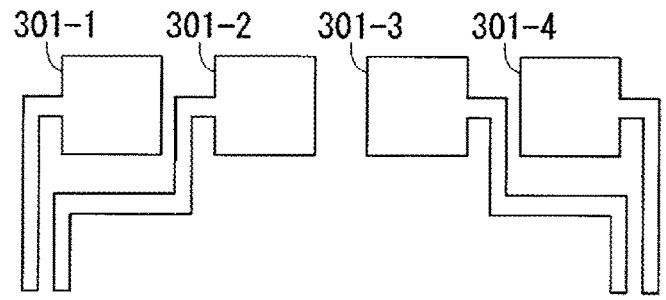
FIG. 9 is a diagram that illustrates a variation example (second variation example) of COM electrodes of an electrophoretic display device according to an exemplary embodiment (first embodiment) of the invention.

FIG. 9 is a diagram that illustrates a variation example (second variation example) of COM electrodes 301-1 to 301-4 of an electrophoretic display device according to an exemplary embodiment (first embodiment) of the invention. The main difference between the COM electrodes 301-1 to 301-4 of this variation example and the COM electrodes 51-1 and 51-2 illustrated in FIG. 4 lies in the number of electrodes. Specifically, the two COM electrodes 51-1 and 51-2 are arranged in the example illustrated in FIG. 4, whereas the four COM electrodes 301-1 to 301-4 are arranged in this variation example. In this variation example, the shape and arrangement of the frame portions of the partitioning wall portion and the conductive agent are determined depending on the shape and arrangement of the four COM electrodes 301-1 to 301-4 of this variation example. In this variation example, the four COM electrodes 301-1 to 301-4 are connected respectively to, for example, the terminals 22-1, 22-2, 22-(N−1), and 22-N. In a case where the four COM electrodes 301-1 to 301-4 are used as in this variation example, it is possible to measure the resistance values of the contact resistors by using, for example, a four-terminal sensing method.

The number, shape, arrangement, etc. of COM electrodes may be modified in various ways. For example, the number of COM electrodes may be any integer that is not less than two.

As described above, in the contact structure 1 of an electrophoretic display device according to the present embodiment, plural (two in the present embodiment) terminals 22-1 and 22-N on the pixel substrate are connected to different positions of the common electrode 54 via the conducting members (the wiring lines 24-1 and 24-2, the COM electrodes 51-1 and 51-2, and the conducting portions 52-1 and 52-2). The conducting members (the wiring lines 24-1 and 24-2, the COM electrodes 51-1 and 51-2, and the conducting portions 52-1 and 52-2) between the respective terminals 22-1 and 22-N and the respective connection points of the common electrode 54 are arranged in such a way as to avoid physical contact (electric contact) between the different terminals 22-1 and 22-N.

In the partitioning wall portion 53 of an electrophoretic display device according to the present embodiment, a partitioning wall (in the example illustrated in FIG. 4, the partitioning wall of the portion located between the two frame portions) is formed also at an area where no pattern of the COM electrodes 51-1 and 51-2 exists in the layer under the partitioning wall portion 53, thereby ensuring sufficient partitioning wall strength. For example, the larger the space between the conducting portions 52-1 and 52-2 and the partitioning wall, the more advantageous for ensuring insertion accuracy of the conducting portions 52-1 and 52-2; however, without the partitioning wall, it would have an adverse influence on the strength of the display panel. For this reason, the structure illustrated in FIG. 4 is used in the present embodiment. Other structure example may be employed as the structure of the partitioning wall portion 53.

As described above, in an electrophoretic display device according to the present embodiment, it is possible to measure the resistance values of contact resistors between electrodes formed on a pixel substrate (the terminals 22-1 and 22-N) and the common electrode 54 easily and simply. By this means, it is possible to check (inspect) the conduction reliability of conducting members (the wiring lines 24-1 and 24-2, the COM electrodes 51-1 and 51-2, and the conducting portions 52-1 and 52-2) for electric conduction of the electrodes formed on the pixel substrate (the terminals 22-1 and 22-N) to the common electrode 54 easily and simply. In this way, in an electrophoretic display device according to the present embodiment, it is possible to directly measure the resistance values of the contact resistors of the common electrode 54. For example, an electrophoretic display device according to the present embodiment makes it possible to perform contact resistance measurement with a simple structure, without any need for a dedicated additional instrument that is to be used exclusively for the measurement, and without any need for secondary processing. Consequently, for example, it is possible to introduce contact resistance measurement into process inspection and to improve the quality and yield of the display panel of an electrophoretic display device.

Other structure examples of the present embodiment will now be explained. In the above embodiment, as illustrated in FIGS. 3 and 4, the partitioning wall portion 53 that has frame portions (two frame portions in the example illustrated in FIGS. 3 and 4) is formed. That is, the partitioning wall portion 53 has a structure in which all of the frame portions and the partitioning wall 36 are formed integrally as a single member. As another structure example of the embodiment, a member that includes all of frame portions (frame member) and a member that constitutes the partitioning wall 36 (partitioning wall member) may be separated from each other. As other structure examples, if there are plural frame portions, all of these frame portions may be formed integrally as a single frame member or may be formed separately as plural frame members, or a part of them may be formed integrally. In this case, the part of frame portions and the partitioning wall 36 may be formed integrally.

In the above embodiment, a partition-type electrophoretic display device in which the space is compartmentalized by the partitioning wall 36 into plural areas (cells) is disclosed. As another structure example of the embodiment, microcapsules (not illustrated) may be used instead of the partitioning wall 36. That is, the disclosed technique may be embodied as a capsule-type electrophoretic display device in which the space is compartmentalized in the form of microcapsules into plural areas (cells). In the capsule-type structure, for example, a transparent film that has plural microcapsules is provided between the pixel substrate and the opposite substrate by using an adhesive or the like. In the capsule-type structure, for example, plural frame portions are formed as a separate member, not integrally with the transparent film having the plural microcapsules. If there are plural frame portions, all of these frame portions may be formed integrally as a single frame member or may be formed separately as plural frame members, or a part of them may be formed integrally.

Second Embodiment

Next, with reference to FIGS. 10, 11, and 12, a second embodiment will now be explained. Structure examples of an electronic apparatus according to an exemplary embodiment of the invention are illustrated in these drawings. The following description of the present embodiment shows specific examples of an electronic apparatus to which an electrophoretic display device according to the foregoing embodiment (electrophoretic display device according to the first embodiment) is applied.

Figure 10:
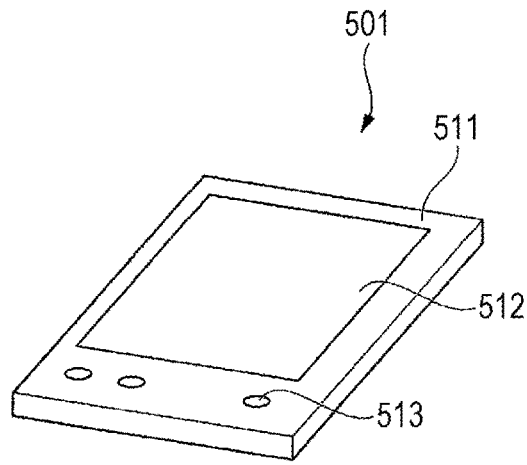
FIG. 10 is a diagram that schematically illustrates a structure example of an electronic apparatus according to an exemplary embodiment (first example of the second embodiment) of the invention.

FIG. 10 is a diagram that schematically illustrates a structure example of an electronic apparatus according to an exemplary embodiment (first example of the second embodiment) of the invention. More specifically, FIG. 10 is a perspective view of an electronic book 501 that is an example of an electronic apparatus. The electronic book 501 includes a book frame 511, a display unit 512, and an operation unit 513. An electrophoretic display device according to the foregoing embodiment is applied to the display unit 512.

Figure 11:
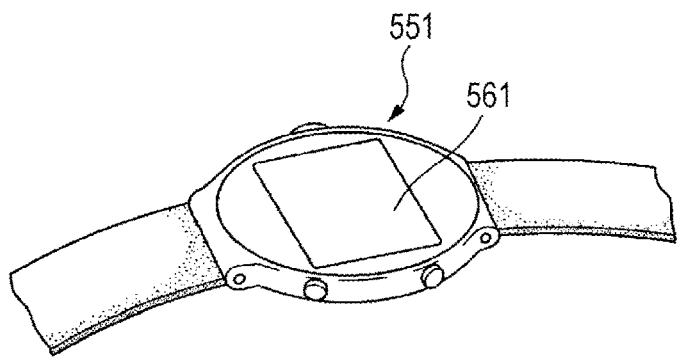
FIG. 11 is a diagram that schematically illustrates a structure example of an electronic apparatus according to an exemplary embodiment (second example of the second embodiment) of the invention.

FIG. 11 is a diagram that schematically illustrates a structure example of an electronic apparatus according to an exemplary embodiment (second example of the second embodiment) of the invention. More specifically, FIG. 11 is a perspective view of a wristwatch 551 that is an example of an electronic apparatus. The wristwatch 551 includes a display unit 561 to which an electrophoretic display device according to the foregoing embodiment is applied.

Figure 12:
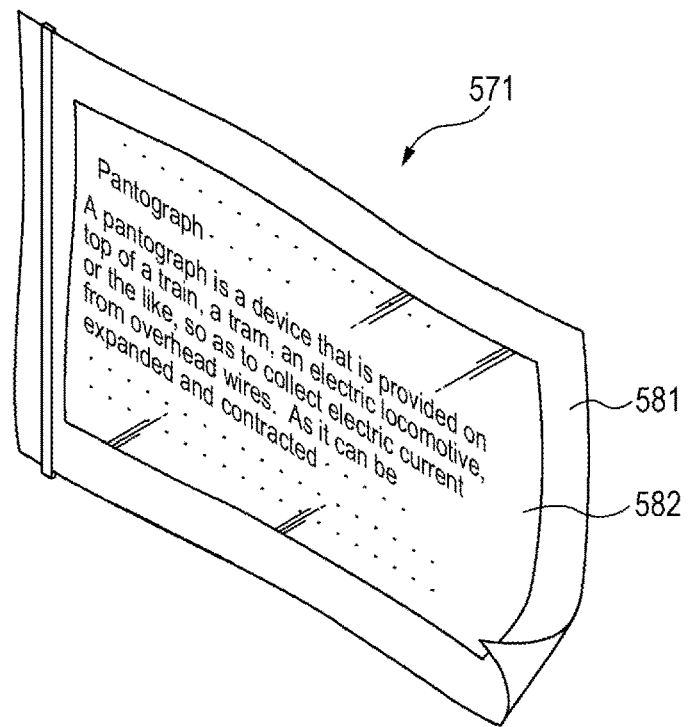
FIG. 12 is a diagram that schematically illustrates a structure example of an electronic apparatus according to an exemplary embodiment (third example of the second embodiment) of the invention.

FIG. 12 is a diagram that schematically illustrates a structure example of an electronic apparatus according to an exemplary embodiment (third example of the second embodiment) of the invention. More specifically, FIG. 12 is a perspective view of electronic paper 571 that is an example of an electronic apparatus. The electronic paper 571 includes a body portion 581 and a display portion 582. The body portion 581 is made of a rewritable sheet that has almost the same texture and flexibility as the texture and flexibility of conventional paper. An electrophoretic display device according to the foregoing embodiment is applied to the display portion 582.

An electrophoretic display device according to the foregoing embodiment may be applied to other various electronic apparatuses, for example, the display unit of an electronic apparatus such as a mobile phone or a portable audio device, etc., an industrial-use sheet such as a manual, etc., a textbook, a workbook, or an information sheet, though not limited thereto.

An electronic apparatus according to the present embodiment described above produces advantageous effects that are the same as, or similar to, advantageous effects produced by an electrophoretic display device according to the foregoing embodiment.

Summary of Foregoing Embodiments

An electrophoretic display device according to a structure example (the electrophoretic display device 11 in the example illustrated in FIG. 2) includes: a first substrate (the opposite substrate 34 in the example illustrated in FIG. 2) on which a common electrode (the common electrode 35 in the example illustrated in FIG. 2, the common electrode 54 in the example illustrated in FIG. 4) is provided; a second substrate (the pixel substrate 31 in the example illustrated in FIG. 2) on which a pixel electrode (the pixel electrodes 32 in the example illustrated in FIG. 2) and a plurality of terminals (the terminals 22-1 to 22-N in the example illustrated in FIG. 1) are provided; dispersion liquid that is provided between the first substrate and the second substrate and includes particles (the particles 42 and 43 in the example illustrated in FIG. 2) and a dispersion medium (the dispersion medium 41 in the example illustrated in FIG. 2); and two or more connecting portions (the COM electrodes 51-1 and 51-2 in the example illustrated in FIG. 4) that electrically connect two or more terminals (the terminals 22-1 and 22-N in the example illustrated in FIG. 1) among the plurality of terminals respectively to different points of the common electrode. A preferred structure example is that, in the electrophoretic display device, the respective two or more terminals among the plurality of terminals are electrically connected to the respective different points of the common electrode via respective conducting portions (the conducting portions 52-1 and 52-2 in the example illustrated in FIG. 4); and each of the conducting portions is provided in an opening of a frame portion (a member that has a frame portion) that has the opening (window region in the frame). A preferred structure example is that, in the electrophoretic display device, a partitioning wall (the partitioning wall 36 in the example illustrated in FIG. 2) is provided between the first substrate and the second substrate; and the dispersion liquid is provided at compartment areas (for example, cells corresponding to pixels) partitioned by the partitioning wall. A preferred structure example is that, in the electrophoretic display device, a plurality of microcapsules is provided between the first substrate and the second substrate; and the dispersion liquid is provided inside the microcapsules. A preferred structure example is that, in the electrophoretic display device, the two or more terminals includes at least, among the plurality of terminals, two end terminals (the terminals 22-1 and 22-N in the example illustrated in FIG. 1). A preferred structure example is that, in the electrophoretic display device, the two or more terminals are at the same potential when driven. An electronic apparatus (for example, the electronic apparatus illustrated in FIG. 10, 11, 12) according to a structure example includes the above electrophoretic display device.

Though exemplary embodiments of the invention are explained in detail above with reference to the accompanying drawings, the variations of specific structure are not limited to those described in the embodiments. The scope of the invention encompasses design, etc. that is within a range not departing from the gist of the invention.

A program for realizing the function of any component of the apparatus described above (for example, electrophoretic display device, electronic apparatus) may be recorded (stored) into a computer-readable recording medium (storage medium), and the program may be read to be executed by a computer system. The "computer system" mentioned here encompasses OS (Operating System) or hardware of peripheral equipment. The "computer-readable recording medium" mentioned here means a portable medium such as flexible disk, magnetic optical disk, ROM (Read Only Memory), CD-ROM (Compact Disk), etc. or a storage device such as a hard disk, etc. built in a computer system. The "computer-readable recording medium" mentioned here includes a medium that retains a program for a defined period of time such as a volatile memory (RAM: Random Access Memory) in a server computer system or a client computer system in a case where the program is transmitted via a network such as the Internet or via a communication channel such as a telephone channel. The program may be transmitted from a computer system in which the program is stored in a storage device, etc. to another computer system via a transmission medium or by means of a transmission wave in a transmission medium. The "transmission medium" transmitting the program mentioned here means a medium that has a function of transmitting information, for example, a network such as the Internet (communication network) or a communication channel such as a telephone channel (communication line). The program may realize a part of the foregoing functions. The program may be capable of realizing the foregoing functions by being combined with a program that has already been recorded in the computer system, that is, may be a so-called difference file (difference program).

The entire disclosure of Japanese Patent Application No. 2015-246046, filed Dec. 17, 2015 is expressly incorporated by reference herein.

What is claimed is:

1. An electrophoretic display device, comprising:
a first substrate on which a common electrode is provided, the common electrode comprising a sheet of conductive material, two or more connecting portions having a plate portion and a connector extending from the plate portion, a partitioning wall portion comprising at least two frame portions located between the sheet and the plate portions, and a conducting portion located within each frame portion and electrically connecting the plate portion of each connecting portion to the sheet;
a second substrate on which a pixel electrode and a plurality of terminals are provided; and
dispersion liquid that is provided between the first substrate and the second substrate and includes particles and a dispersion medium
wherein the connecting portions electrically connect two or more terminals among the plurality of terminals respectively to different points of the common electrode.

2. The electrophoretic display device according to claim 1,
wherein to the partitioning wall is provided between the first substrate and the second substrate; and
wherein the dispersion liquid is provided at compartment areas partitioned by the partitioning wall.

3. The electrophoretic display device according to claim 1,
wherein a plurality of microcapsules is provided between the first substrate and the second substrate; and
wherein the dispersion liquid is provided inside the microcapsules.

4. The electrophoretic display device according to claim 1,
wherein the two or more terminals includes at least, among the plurality of terminals, two end terminals.

5. The electrophoretic display device according to claim 1,
wherein the two or more terminals are at the same potential when driven.

6. An electronic apparatus comprising: the electrophoretic display device according to claim 1.

7. An electronic apparatus comprising: the electrophoretic display device according to claim 2.

8. An electronic apparatus comprising: the electrophoretic display device according to claim 3.

9. An electronic apparatus comprising: the electrophoretic display device according to claim 4.

10. An electronic apparatus comprising: the electrophoretic display device according to claim 5.

* * * * *